US011729719B2

(12) United States Patent
Ina (10) Patent No.: US 11,729,719 B2
(45) Date of Patent: Aug. 15, 2023

(54) COMMUNICATION APPARATUS, METHOD OF CONTROLLING THE SAME, AND NON-TRANSITORY COMPUTER-READABLE STORAGE MEDIUM FOR SETTING TRANSMISSION RATE

(71) Applicant: CANON KABUSHIKI KAISHA, Tokyo (JP)

(72) Inventor: Eigoro Ina, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 17/215,922

(22) Filed: Mar. 29, 2021

(65) Prior Publication Data

US 2021/0219236 A1 Jul. 15, 2021

Related U.S. Application Data

(63) Continuation of application No. PCT/JP2019/046994, filed on Dec. 2, 2019.

(30) Foreign Application Priority Data

Dec. 27, 2018 (JP) ................................ 2018-245380

(51) Int. Cl.
*H04W 52/02* (2009.01)
*H04W 76/11* (2018.01)
(Continued)

(52) U.S. Cl.
CPC ....... *H04W 52/0235* (2013.01); *H04W 28/06* (2013.01); *H04W 28/22* (2013.01);
(Continued)

(58) Field of Classification Search
CPC ......... H04W 52/0235; H04W 52/0229; H04W 28/06; H04W 28/22; H04W 48/10; H04W 76/11; H04W 76/27
See application file for complete search history.

(56) References Cited

U.S. PATENT DOCUMENTS

2007/0008943 A1* 1/2007 Grant .................... H04L 1/0033
370/342
2017/0094600 A1 3/2017 Min et al.
(Continued)

FOREIGN PATENT DOCUMENTS

WO 2016/189933 A 12/2016
WO 2018/038532 A 3/2018

OTHER PUBLICATIONS

International Search Report issued by the Japan Patent Office dated Mar. 3, 2020 in corresponding International Application No. PCT/JP2019/046994, with English translation.

*Primary Examiner* — Robert C Scheibel
(74) *Attorney, Agent, or Firm* — Carter, DeLuca & Farrell LLP (57) ABSTRACT

A communication apparatus that includes a first communication unit for connecting to another communication apparatus and communicating by using a PCR (Primary Connectivity Radio) function in compliance with the IEEE802.11ba standard and a second communication unit for communicating with the other communication apparatus by using a WUR (Wake Up Radio) function in compliance with the IEEE802.11ba standard, the apparatus obtains, from a signal received from the other communication apparatus by the second communication unit, a value indicating a signal intensity or a signal quality of the signal, and sets, based on the obtained value, a transmission rate of the first communication unit.

11 Claims, 4 Drawing Sheets

(51) Int. Cl.
*H04W 76/27* (2018.01)
*H04W 28/06* (2009.01)
*H04W 28/22* (2009.01)
*H04W 48/10* (2009.01)

(52) U.S. Cl.
CPC ....... *H04W 48/10* (2013.01); *H04W 52/0229* (2013.01); *H04W 76/11* (2018.02); *H04W 76/27* (2018.02)

(56) References Cited

U.S. PATENT DOCUMENTS

| | | | |
|---|---|---|---|
| 2018/0234918 A1 | 8/2018 | Asterjadhi et al. | |
| 2018/0309538 A1* | 10/2018 | Verma | H04L 1/0002 |
| 2019/0014541 A1* | 1/2019 | Li | H04W 52/0229 |
| 2019/0116555 A1* | 4/2019 | Kristem | H04L 27/2613 |
| 2019/0223101 A1* | 7/2019 | Li | H04W 52/0229 |
| 2019/0320389 A1* | 10/2019 | Alanen | H04W 72/0446 |
| 2020/0187120 A1* | 6/2020 | Alanen | H04W 52/0212 |

\* cited by examiner

COMMUNICATION APPARATUS, METHOD OF CONTROLLING THE SAME, AND NON-TRANSITORY COMPUTER-READABLE STORAGE MEDIUM FOR SETTING TRANSMISSION RATE

CROSS-REFERENCE TO RELATED APPLICATIONS

This application is a Continuation of International Patent Application No. PCT/JP2019/046994, filed Dec. 2, 2019, which claims the benefit of Japanese Patent Application No. 2018-245380, filed Dec. 27, 2018, both of which are hereby incorporated by reference herein in their entirety.

BACKGROUND OF THE INVENTION

Field of the Invention

The present invention relates to a wireless communication technique.

Background Art

IEEE802.11ba which is currently being standardized proposes an arrangement in which a communication apparatus includes, in addition to a conventional wireless LAN transceiver (a transceiver that has a PCR function), a WUR transmitter or receiver (a transmitter or receiver that has a WUR function) that can operate with greater power savings (PTL 1). Note that PCR is the abbreviation of Primary Connectivity Radio, and WUR is the abbreviation of Wake Up Radio. In the following description, a transceiver which has a PCR function and a transmitter or receiver which has a WUR function will also be referred to as a PCR unit and a WUR unit, respectively.

Additionally, a WUR mode has been defined in iEEE802.11ba, and an AP (Access Point) will periodically transmit a WUR beacon in this mode. An STA (Station) that has received the WUR beacon transmitted from the AP can maintain synchronization with the AP without having to communicate by using a PCR unit. If data to be transmitted from the STA to the AP is generated during the WUR mode, the STA can end the WUR mode and transmit the data from the PCR unit to the AP. Also, if data to be transmitted from the AP to the STA is generated during the WUR mode, the AP will transmit a WUR Wake-up frame to the STA. In response, the STA will use a WUR unit to receive the WUR Wake-up frame, end the WUR mode, and be able to use the PCR unit to receive the data from the AP.

CITATION LIST

Patent Literature

PTL 1 US-2018-0234918

In general, in wireless LAN communication, a communication apparatus will set, immediately after connecting to a partner communication apparatus, a low data rate to be used as the data rate of a wireless signal that is used for data frame transmission. Subsequently, the communication apparatus will gradually increase the data rate while confirming that a reception response (Ack: Acknowledgement) is being returned from the partner communication apparatus. When an Ack is not received, the communication apparatus will reduce the data rate and retransmit the wireless signal. Similar processing is performed in frame aggregation that has been adopted in IEEE802.11n and subsequent standards. That is, the communication apparatus will gradually increase the number of frames (data count) to be aggregated if the data frame transmission has succeeded, but will decrease the number of frames or stop the frame aggregation operation if the data frame transmission has failed.

On the other hand, since the PCR unit is disabled in the communication apparatus during the WUR mode, the suitability of the frame aggregation setting or the data rate of the signal to be used in the transmission by the PCR unit immediately after the end of the WUR mode is unknown. In particular, if a communication path has changed, due to the movement of the communication apparatus as the STA or the like, during a period in which the WUR mode is set, it is highly likely that the data rate and the frame aggregation setting will need to be changed from those used before the execution of the WUR mode.

For example, assume a state in which a high data rate has been selected and the number of frames to be aggregated is large because the AP and the STA are in a close distance from each other when the WUR mode was started. Assume a case in which the STA shifts to the WUR mode in this state and the STA moves to a distant location from the AP during the WUR mode. In this case, if the STA uses, after the end of the WUR mode, the PCR unit to transmit a wireless signal to the AP under the same settings as those used before the start of the WUR mode, a state in which the AP will not receive the signal may occur. Hence, the STA will need to change the data rate and the frame aggregation settings again and retransmit the wireless signal, and such a retransmission operation will need to be continued until an Ack is received from the AP. The repetition of the retransmission operation is not desirable in the point of view of power consumption, the point of view of the communication speed, the point of view of spatial/spectral efficiency, and the like.

As another example, assume a state in which a comparatively low data rate has been selected and the number of frames to be aggregated is small or the frame aggregation operation has been disabled because the AP and the STA are in a long distance from each other when the WUR mode was started. Assume a case in which the STA shifts to the WUR mode in this state and the STA moves to a closer location to the AP during the WUR mode. Although communication can be performed at a higher data rate in this case, if the STA uses the PCR unit to transmit a wireless signal to the AP under the same settings as those used before the start of the WUR mode, a communication speed slower than a communication speed that can be actually implemented will be used and the communication time will be prolonged.

In consideration of the above problem, the present invention provides a technique for appropriately determining a setting related to data transmission to be performed after the end of the WUR mode.

SUMMARY OF THE INVENTION

According to one aspect of the present invention, there is provided a communication apparatus, which comprises: a first communication unit configured to connect to another communication apparatus and communicating by using a PCR (Primary Connectivity Radio) function in compliance with the IEEE802.11ba standard; a second communication unit configured to communicate with the other communication apparatus by using a WUR (Wake Up Radio) function in compliance with the IEEE802.11ba standard; an obtainment unit configured to obtain, from a signal received from the other communication apparatus by the second communication unit, a value indicating a signal intensity or a signal quality of the signal; and a setting unit configured to set, based on the value obtained by the obtainment unit, a transmission rate of the first communication unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Network Arrangement)

Figure 1:
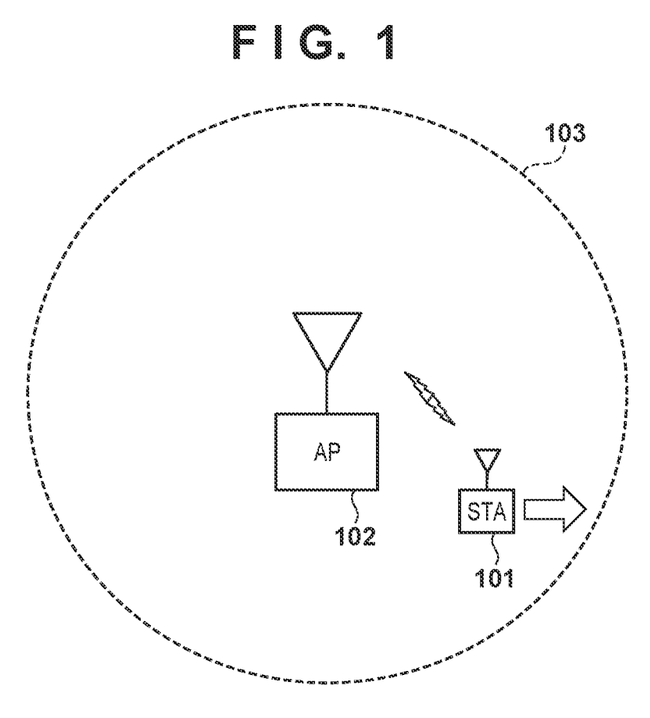
FIG. 1 is a view showing an example of the arrangement of a wireless network according to an embodiment.

FIG. 1 shows an example of the arrangement of a wireless network according to this embodiment. An STA 101 is a WUR non-AP STA (wireless LAN terminal) in compliance with the IEEE802.11ba standard, and is, as will be described later, a communication apparatus that includes a PCR unit and a WUR unit according to the IEEE802.11ba standard. Here, IEEE is the abbreviation of Institute of Electrical and Electronics Engineers. Also, PCR is the abbreviation of Primary Connectivity Radio, and WUR is the abbreviation of Wake-Up Radio.

In addition, the STA 101 establishes a wireless connection with an AP 102 by using a PCR unit to execute association and authentication or the like in compliance with the IEEE802.11 series standard. The STA 101 can also execute data communication with the AP 102 by using the PCR unit to transmit/receive a frame in compliance with the IEEE802.11 series standard.

Furthermore, the STA 101 can maintain synchronization with the AP 102 by operating in a WUR mode in compliance with the IEEE802.11ba standard and using a WUR unit to receive a WUR beacon transmitted from the AP 102. The WUR mode is a mode in which the PCR unit is shifted to a doze state according to the IEEE802.11 series standard and the WUR unit is shifted to a communicable state. During the WUR mode, the STA 101 can set the PCR unit in the doze state to suppress the power consumption related to the communication with the AP 102. Note that the doze state is a power saving state that stops a function for transmitting/receiving signals to/from the AP 102 by using the PCR unit.

Note that when data to be transmitted to the AP 102 is generated, the STA 101 that is operating in the WUR mode can end the WUR mode and use the PCR unit to transmit data to the AP 102. Also, when the WUR unit of the STA 101 has received a WUR Wake-up frame in compliance with the IEEE802.11ba standard from the AP 102, the STA 101 can end the WUR mode and use the PCR unit to receive the data from the AP 102. Note that in this embodiment, assume that the STA 101 is moving and a range (illustrated as a circle 103 in FIG. 1) of this movement is within a communicable range of the AP 102.

The AP 102 is a WUR AP (wireless LAN access point) in compliance with the IEEE802.11ba standard, and includes, in a similar manner, a PCR unit and a WUR unit according to the IEEE802.11ba standard. The PCR unit of the AP 102 constructs a wireless network in compliance with the IEEE802.11 series standard. In addition, a beacon transmitted by the PCR unit of the AP 102 is a PCR beacon in compliance with the IEEE802.11ba standard. The PCR beacon includes information indicating that the AP 102 is in compliance with IEEE802.11ba. The WUR unit of the AP 102 also transmits a WUR beacon in compliance with the IEEE802.11ba standard. The WUR beacon includes TSF information that is used to maintain synchronization with the AP 102 or is transmitted to each individual WUR non-AP STA or a plurality of non-AP STAs which have been grouped together. Note that TSF is the abbreviation of Timing Synchronization Function.

Note that the STA 101 may be, for example, an image input apparatus such as an image capturing apparatus (a camera, a video camera, or the like), a scanner, or the like or an image output apparatus such as a printer (an SFP or an MFP), a copying machine, a projector, or the like. It may also be a storage device such as a hard disk device or a memory device or an information processing apparatus such as a personal computer, a smartphone, or the like. Note that SFP is the abbreviation of Single Function Printer, and MFP is the abbreviation of Multi-Function Printer. It may also be an IoT (Internet of Things) device such as a sensor that can connect to the Internet via the AP 102.

(Arrangement of STA)

Figure 2A:
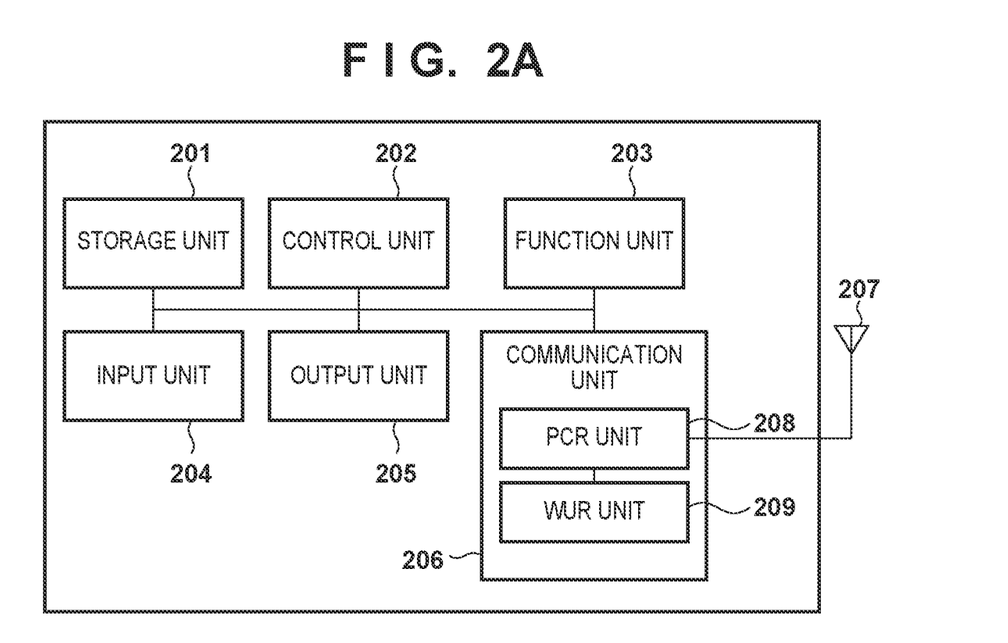
FIG. 2A is a block diagram showing an example of the hardware arrangement of an STA.
Figure 2B:
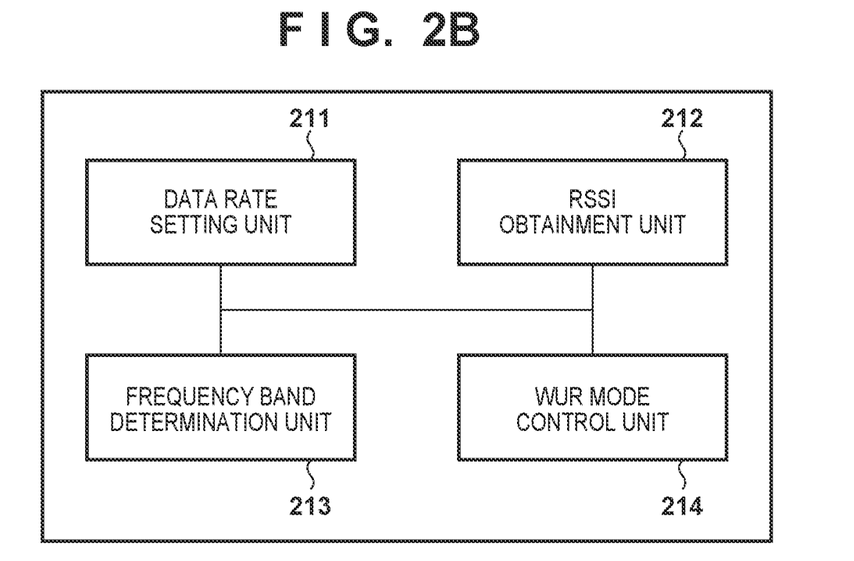
FIG. 2B is a block diagram showing an example of the functional arrangement of the STA.

The arrangement of the STA 101 will be described with reference to FIGS. 2A and 2B. FIG. 2A is a block diagram showing an example of the hardware arrangement of the STA 101, and FIG. 2B is a block diagram showing an example of the functional arrangement of the STA 101. The hardware arrangement of the STA 101 will be described first. In FIG. 2A, a storage unit 201 is formed by one or more memories such as a ROM, a RAM, and the like, and stores programs for executing various kinds of operations (to be described later) and various kinds of information such as communication parameters for wireless communication and the like. Note that other than a memory such as a ROM, a RAM, or the like, a storage medium such as a flexible disk, a hard disk, an optical disk, a magneto-optical disk, a CD-ROM, a CD-R, a magnetic tape, a nonvolatile memory card, a DVD, or the like can be used as the storage unit 201.

A control unit 202 is formed by one or more processors such as a CPU, an MPU, and the like, and controls the entire STA 101 by executing programs stored in the storage unit 201. Note that the control unit 202 may control the entire STA 101 by the cooperation of an OS (Operating System) and programs stored in the storage unit 201. The control unit 202 may also include a plurality of processors such as a multicore processor or the like, and control the entire STA 101 by the plurality of processors.

In addition, the control unit 202 controls a function unit 203 to execute predetermined processing as image capturing, printing, projection, or the like. The function unit 203 is hardware for the STA 101 to execute the predetermined processing. For example, in a case in which the STA 101 is a camera, the function unit 203 will be an image capturing unit and perform image capturing processing. Alternatively, in a case in which the STA 101 is a printer, the function unit 203 will be a printing unit and perform print processing. Alternatively, in a case in which the STA 101 is a projector, the function unit 203 will be a projection unit and perform projection processing. The data to be processed by the function unit 203 may be data stored in the storage unit 201 or data obtained by communicating with another communication apparatus via a communication unit 206 (to be described later).

An input unit 204 accepts various kinds of operations performed by a user. An output unit 205 performs various kinds of outputs to the user. Here, an output by the output unit 205 includes at least one of display on a screen, an audio output by loudspeaker, an output by vibration, and the like. Note that both the input unit 204 and the output unit 205 may be implemented by a single module such as a touch panel. The communication unit 206 controls an antenna 207 to transmit/receive wireless signals for wireless communication. Note that the number of antennas 207 is not limited to one, and there may be a plurality of antennas.

Furthermore, the communication unit 206 includes a PCR unit 208 and a WUR unit 209. The PCR unit 208 has a PCR function, and performs wireless communication control in compliance with the IEEE802.11 series standard. The WUR unit 209 has a WUR function, and periodically waits to receive a signal such as a WUR beacon, a WUR Wake-up frame, or the like when the WUR mode is started. The WUR unit 209 has a function for notifying, when the WUR Wake-up frame has been received, the PCR unit 208 of the reception of the WUR Wake-up frame and ending the WUR mode. During the period of the WUR mode, the PCR unit 208 will stop the function for transmitting/receiving signals for the sake of power saving. Hence, the function of the communication unit 206 will be wholly performed by the WUR unit 209. The PCR unit 208 and the WUR unit 209 each have a function for notifying the control unit 202 of a value of an RSSI indicating the reception signal intensity of a wireless signal, and can store the value of a past RSSI in the storage unit 201 via the control unit 202. Note that RSSI is the abbreviation of Received Signal Strength Indicator.

Note that each of the PCR unit 208 and the WUR unit 209 is formed as an independent RF circuit. However, the present invention is not limited to this, and the PCR unit 208 and the WUR unit 209 may also be formed as an integrated RF circuit. In such a case, if the PCR is to be set to an awake state, the STA 101 will enable the function of the PCR unit 208. On the other hand, if the PCR is to be set in a doze state, the function of the PCR unit 208 will be disabled. The STA 101 will also control the WUR in a similar manner. An RF circuit in which the PCR unit 208 and the WUR unit 209 have been integrated will operate in a state in which power can be saved more when the function of the WUR unit 209 has been enabled than when the function of the PCR unit 208 has been enabled. Note that, a case in which the PCR unit 208 is set in the awake state in this embodiment corresponds to a state in which the PCR function has been enabled in an RF circuit in which the PCR and the WUR have been integrated. Also, a case in which the WUR unit 209 is set in the awake state in this embodiment corresponds to a state in which the WUR function has been enabled in an RF circuit in which the PCR and the WUR have been integrated.

The functional arrangement of the STA 101 will be described next. In FIG. 2B, a data rate setting unit 211 determines and sets the data rate to be used when the PCR unit 208 of the STA 101 is to transmit a data frame. An RSSI obtainment unit 212 performs measurement processing or the like to obtain the RSSI of a signal received by the communication unit 206. A frequency band determination unit 213 determines whether the frequency band of a received signal is the same as the frequency band used by the PCR unit 208. A WUR mode control unit 214 controls the start, the continuation, and the end of the WUR mode of the STA 101. The WUR mode control unit 214 also executes, in accordance with the change in the WUR mode, control to shift the state of the PCR unit 208 into the doze state or the awake state in compliance with the IEEE802.11 series standard.

(Procedure of Processing)

Processing performed when the STA 101 has established a wireless connection with the AP 102 which is in compliance with IEEE802.11ba will be described next. Note that this embodiment will describe an example of data rate adjustment as the adjustment of a transmission rate (transmission speed or communication speed) of the PCR unit 208 which is in the awake state upon returning from the WUR mode.

Figure 3A:
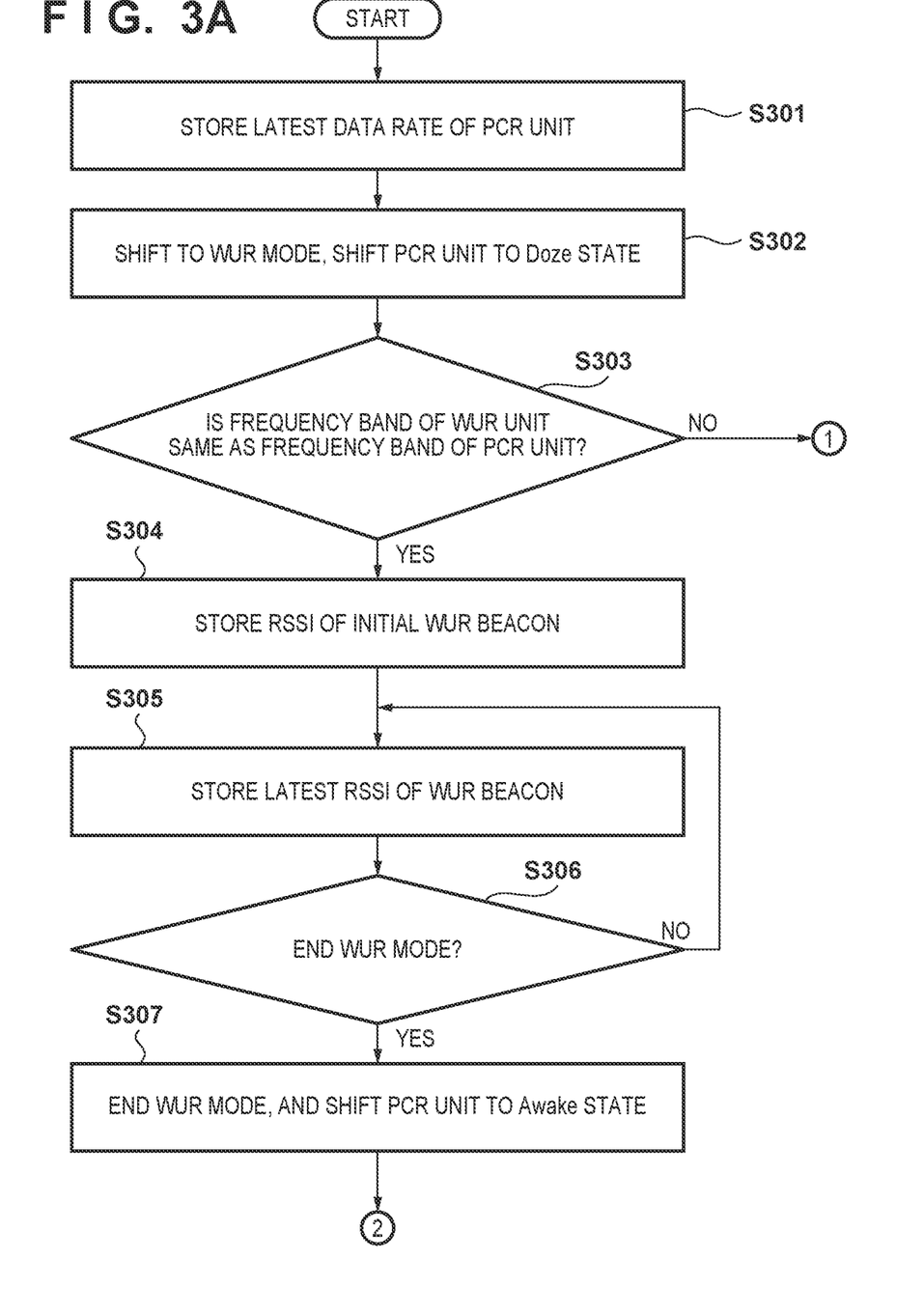
FIG. 3A is a flowchart showing the processing of the STA according to the embodiment.
Figure 3B:
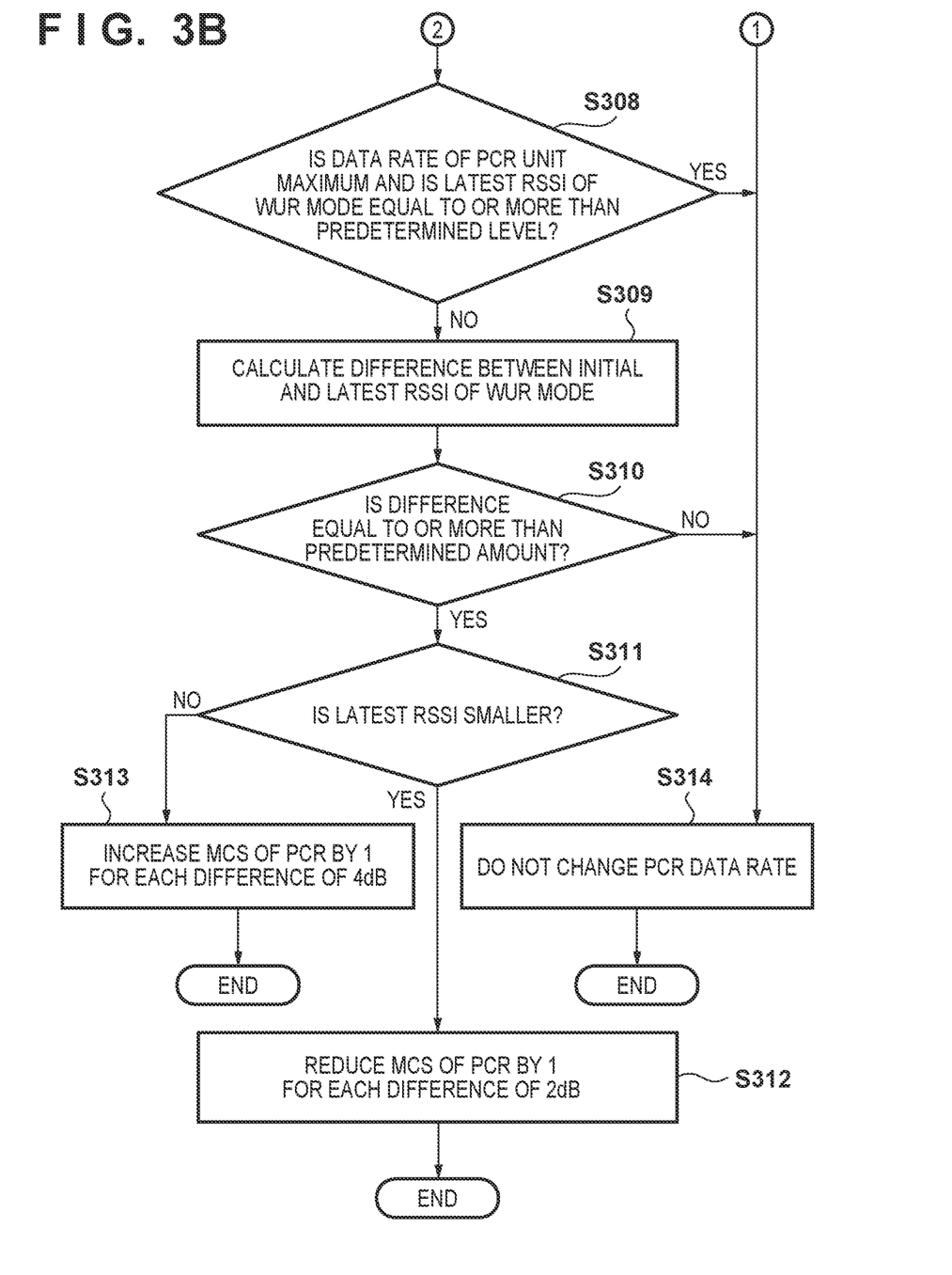
FIG. 3B is a flowchart showing the processing of the STA according to the embodiment.

FIGS. 3A and 3B are flowcharts showing the processing of the STA 101 according to this embodiment. Note that when a wireless connection is to be established with the AP 102, it will be assumed that the STA 101 has received a PCR beacon which is periodically transmitted from the AP 102. Here, the PCR beacon transmitted from the AP 102 includes the information indicating that the AP 102 is in compliance with IEEE802.11ba and the information related to a channel (frequency band) used in the WUR mode. Hence, by receiving a PCR beacon, the STA 101 can determine that the AP 102, with which the wireless connection has been established, is in compliance with IEEE802.11ba. The processing of the flowcharts shown in FIGS. 3A and 3B is implemented by the control unit 202 reading out and executing a program stored in the storage unit 201 of the STA 101. In addition, some or all of the processes of the steps shown in the flowcharts of FIGS. 3A and 3B may be implemented by, for example, hardware such as an ASIC or the like. Here, ASIC is the abbreviation of Application Specific Integrated Circuit.

The data rate setting unit 211 of the STA 101 stores, in the storage unit 201, the latest value (the data rate before (for example, immediately before) the start of the WUR mode) of the data rate used by the PCR unit 208 in the awake state when a data frame is transmitted to the AP 102 (step S301).

Next, when the WUR mode control unit 214 determines to shift the STA 101 into the WUR mode, the STA 101 will execute processing to shift to the WUR mode with the AP 102 (step S302). For example, upon accepting an operation by the user or based on the fact that the STA 101 has not transmitted data for a predetermined time, the WUR mode control unit 214 will determine to shift the STA 101 to the WUR mode. More specifically, as the processing executed to shift the STA to the WUR mode, the PCR unit 208 of the STA 101 will transmit an Enter WUR Mode Request frame, which is a request to start the WUR mode, to the AP 102. The Enter WUR Mode Request frame includes the cycle information (duty cycle period) that indicates the cycle (reception interval) of the period in which the WUR unit 209 will wait to receive a signal from the WUR unit of the AP 102. The AP 102 determines, as the transmission cycle (WUR duty cycle) of the WUR beacon, the reception interval included in the Enter WUR Mode Request frame received from the STA 101. Subsequently, the AP 102 transmits an Enter WUR Mode Response frame which includes the start timing information ("Starting Time Of The WUR Duty Cycle") indicating the start timing of the transmission interval.

The PCR unit 208 of the STA 101 receives the Enter WUR Mode Response frame from the AP 102, and will transmit a WUR Mode Enter frame to the AP 102 if it agrees with the contents of the Enter WUR Mode Response frame, that is, the start timing information. Subsequently, the WUR mode control unit 214 will cause, at a timing based on the start timing information, the WUR unit 209 to start waiting to receive a signal. Furthermore, the WUR mode control unit 214 will cause the PCR unit 208 to shift to the doze state (step S302). The STA 101 shifts to the WUR mode in this manner. Note that each of the Enter WUR Mode Request frame and the Enter WUR Mode Response frame is an action frame in compliance with the IEEE802.11 series standard.

Upon shifting to the WUR mode, the frequency band determination unit 213 of the STA 101 determines whether the frequency band of the WUR beacon received by the WUR unit 209 is the same as the frequency band that was used for data frame transmission by the PCR unit 208 (step S303). Here, one of two kinds of frequency bands, that is, the 2.4 GHz band (the center frequency is between 2.412 GHz and 2.472 GHz) and the 5 GHz band (the center frequency is between 5.18 GHz and 5.7 GHz) is assumed as the frequency band. A frequency band obtained by further dividing the 5 GHz band by 2 (5.18 GHz to 5.32 GHz and 5.5 GHz to 5.7 GHz) or by 3 (5.18 GHz to 5.24 GHz, 5.26 GHz to 5.32 GHz, and 5.5 GHz to 5.7 GHz) may also be used.

In a case in which the frequency band of the WUR beacon is different from the frequency band used for the data frame transmission by the PCR unit 208 (NO in step S303), the process advances to step S314. In step S314, when the PCR unit 208 has shifted to the awake state and is to perform data transmission by PCR, the data rate setting unit 211 determines to use, without changing the data rate, the data rate stored in step S301 (step S314). That is, the data rate setting unit 211 will determine to use the data rate used by the PCR unit 208 in the awake state before PCR unit shifted to the doze state as the data rate to be used by the PCR unit 208 after the PCR unit shifts to the awake state from the doze state. This is because it will lack accuracy if the state amount change obtained during the WUR mode is reflected on the data rate for the transmission by the PCR unit 208 in a case in which the different frequency bands are used by the PCR unit 208 and the WUR unit 209.

In a case in which the frequency band of the WUR beacon is the same as the frequency band used for the data frame transmission by the PCR unit 208 (YES in step S303), the process advances to step S304. In step S304, the RSSI obtainment unit 212 obtains the RSSI of the WUR beacon received by the WUR unit 209 and stores the RSSI as the initial RSSI of the WUR mode in the storage unit 201. Note that the process of step S304 may be performed before the process of step S303. During the WUR mode, the RSSI obtainment unit 212 obtains the RSSI of the WUR beacon each time the WUR beacon is received, and stores the obtained RSSI as the latest RSSI in the storage unit 201 (step S305). Note that the timing for receiving the WUR beacon is determined based on the cycle (reception interval) of the period in which the WUR unit 209 waits to receive a signal from the WUR of the AP 102 and the start timing information included in the Enter WUR Mode Response frame.

During the WUR mode, the WUR mode control unit 214 determines whether to end the WUR mode every predetermined period (step S306). The WUR mode control unit 214 executes this determination based on, for example, whether data to be transmitted from the STA 101 to the AP 102 is present. In this case, the WUR mode control unit 214 will determine to not to continue the WUR mode and end the WUR mode if data to be transmitted is present, and will determine to continue the WUR mode if the data to be transmitted is not present. In addition, the WUR mode control unit 214 can also determine to end the WUR mode in a case in which the WUR unit 209 has received a WUR Wake-up frame from the AP 102.

If the WUR mode is to be continued (NO in step S306) as a result of the determination performed in step S306, the RSSI obtainment unit 212 will store, in response to the WUR unit 209 receiving the WUR beacon again, the RSSI of the received WUR beacon as the latest RSSI in the storage unit 201 (step S305). On the other hand, if the WUR mode is to be ended (YES in step S306) as a result of the determination performed in step S306, the WUR mode control unit 214 causes the PCR unit 208 to shift from the doze state to the awake state. This act of causing the PCR unit 208 to shift to the awake state is also referred to as activation. Subsequently, the STA 101 restarts communicating with the AP 102 via the PCR unit 208 (step S307).

The processes of step S308 and subsequent steps that follow the process of step S307 are processes by which the data rate setting unit 211 determines the data rate to be used for data frame transmission before the activated PCR unit 208 is to transmit a data frame. In step S308, the data rate setting unit 211 determines whether the data rate stored in step S301 is the maximum data rate that can be used by the STA 101 and whether the latest RSSI is equal to or more than a predetermined level. Since the possibility that the STA 101 can continue using the maximum data rate will be high in a case in which these two conditions are satisfied (YES in step S308), the data rate setting unit 211 will determine not to change the data rate of the PCR (step S314). Note that the above-described predetermined level used in the comparison of the RSSI has a value of a level sufficient enough to maintain the maximum data rate. On the other hand, in a case in which the data rate stored in step S301 is other than the maximum data rate that can be used or in a case in which the RSSI of the latest WUR beacon is less than the predetermined level (NO in step S308), the data rate setting unit 211 will determine the data rate to be used by the PCR unit 208 in the processes of the subsequent steps. This is because the possibility that a data rate other than the maximum data rate will be appropriate for the STA 101 to use is high.

Next, the data rate setting unit 211 calculates, as the amount of change of the RSSI, the difference between the initial RSSI obtained in step S304 during the WUR mode and the latest RSSI obtained in step S305 (step S309). Subsequently, the data rate setting unit 211 determines whether the calculated difference is equal to or more than a predetermined amount (step S310). Here, as an example of the predetermined amount, a case in which the latest RSSI has increase by 4 dB or more or has decreased by 2 dB or more than the initial RSSI will be considered.

In a case in which the difference is less than the predetermined amount (NO in step S310), the data rate setting unit 211 determines not to change but use, as the data rate to be used in the data frame transmission by the PCR unit 208, the data rate stored in step S301 before the shift to the WUR mode (step S314). On the other hand, in a case in which the difference is equal to or more than the predetermined amount (YES in step S310), the data rate setting unit 211 will further determine whether the latest RSSI is smaller or larger than the initial RSSI of the WUR mode (step S311). That is, the data rate setting unit 211 determines whether the change in the RSSI caused by the difference between the RSSIs is due to an increase in the RSSI or a decrease in the RSSI.

In a case in which the latest RSSI has become smaller than the initial RSSI (the change in the RSSI is due to the decrease in the RSSI) (YES in step S311), the degradation of the communication environment between the STA 101 and the AP 102 can be considered. An increase in the distance between the STA 101 and the AP 102, an arrangement of an obstacle between the STA 101 and the AP 102, or the like can be assumed as the main cause of this degradation. In a state in which the communication environment has degraded in this manner, the data rate needs to be lowered to allow transmission to be performed over a greater distance. In addition, a small amount of change in the data rate may not be able to ensure a necessary transmission distance, and transmission may need to be executed again. Hence, the data rate needs to be lowered comparatively more than the amount of change in the RSSI.

In consideration of the above condition, the data rate setting unit 211 determines to use a data rate obtained by decreasing, in correspondence with the amount of change in the RSSI, the data rate stored in step S301. Here, as an example, the data rate setting unit 211 will reduce, step by step, modulation and coding schemes (MCS (a scheme indexing the combinations of modulation types and coding rates)) defined in IEEE802.11 each time the difference between the RSSIs increases by 2 dB (step S312). In addition, in relation to the data rate of OFDM, DSSS, or CCK that has been defined before IEEE802.11n and is not defined by MCS, the data rate setting unit 211 will reduce the data rate, step by step, for each 2 dB from the list of the usable data rate. In this manner, the data rate setting unit 211 can lower the data rate to be used by the PCR unit 208 in correspondence with the amount of change in the RSSI of the WUR beacon to reduce the frequency of retransmission in the data frame transmission performed by the PCR unit 208 immediately after the end of the WUR mode. In addition, it will be possible to simultaneously start the communication again in a state close to the appropriate data rate without having to lower the data rate more than necessary.

On the other hand, in a case in which the latest RSSI has become larger than the initial RSSI (NO in step S311), the communication environment between the STA 101 and the AP 102 can be considered to have improved more than the time when the WUR mode was started. In this case, it is highly possible that data frame transmission can be performed even at a higher data rate. Thus, if data frame transmission is performed by maintaining a low data rate, it will require more time than necessary in the communication and cause the power consumption and the spatial efficiency to degrade. Hence, it is preferable to execute communication by improving the data rate. However, data frame transmission may fail and retransmission may need to be performed if a required transmission distance cannot be ensured due to an excessive increase in the data rate. Therefore, the data rate needs to be raised by a comparatively small amount with respect to the amount of change in the RSSI.

In consideration of the above condition, the data rate setting unit 211 determines to use a data rate obtained by increasing, in correspondence with the amount of change in the RSSI, the data rate stored in step S301 (the amount of increase will be smaller than the amount of decrease in step S312). Here, as an example, the data rate setting unit 211 will increase, step by step, the MCS each time the difference between the RSSIs increased by 4 dB (step S313). As a result, even in the data frame transmission performed by PCR immediately after the end of the WUR mode, efficient communication can be performed by using a higher data rate while suppressing the occurrence of retransmission.

Note that although the above-described embodiment described a series of procedures in which the RSSI (Reception Signal Strength Indicator) of the WUR beacon is used, the present invention is not limited to such a reception signal strength indicator and may use an index that indicates a reception signal quality or the like or the property of a reception signal. For example, a similar effect can be expected by using an SNR (Signal-to-Noise Ratio), an SINR (Signal-to-Noise Interference Ratio), an RSRP (Reference Signal Received Power), or an RSRQ (Reference Signal Received Quality).

Also, although only the data rate is adjusted by changing in the MCS in the above-described embodiment, the setting related to another transmission rate may be adjusted. For example, the setting (the number of frames) of frame aggregation, the number of antennas or the spatial multiplexing number, or the number of channels to be bundled when channel bonding is to be used may be adjusted. In a case in which the number of frames of the frame aggregation is to be adjusted, it can be arranged so that the number of frames to be aggregated in the frame aggregation will be increased when the RSSI (alternatively may be the SIR, the SINR, the RSRP, or the RSRQ. Similarly applicable below) of the WUR beacon has increased at the end of the WUR mode. On the other hand, it can be arranged so that the number of frames to be aggregated will be decreased when the RSSI of the WUR beacon has decreased. As a result, it will be possible to expect an effect similar to that of the above-described embodiment. Note that when adjusting another setting such as this, the number of frames of frame aggregation, the number of antennas or the spatial multiplexing number, or the number of channels to be bundled when channel bonding is to be used may be used as the data rate to be the processing target in step S301 of FIG. 3A and step S308 of FIG. 3B, or the data rate as shown in FIGS. 3A and 3B may be used as the processing target.

In addition, although the above-described embodiment excludes a case in which the PCR unit 208 and the WUR unit 209 have different frequency bands from each other in the process of step S303 of FIG. 3A, such a case need not always be excluded, and an effect can be expected even if processing is performed in a manner similar to that of a case in which the frequency bands are the same. In addition, although the difference between the initial RSSI and the latest RSSI is obtained in the process of step S309, it may be arranged so that the difference will be calculated by using one of the periodically received RSSIs. Furthermore, although the data rate is adjusted step by step in the processes of steps S312 and S313, it may be arranged so that the data rate will be adjusted by referring to a lookup table or by another method. This is similarly applicable to other examples of transmission rates to be adjusted such as the frame aggregation setting, the number of antennas, and the like.

According to the present invention, the setting related to data transmission to be performed after the end of the WUR mode can be determined appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
one or more memories that store computer-readable instructions for causing, when executed by the one or more processors, the communication apparatus to:
perform first communication with another communication apparatus by using a Wake Up Radio (WUR) frame corresponding to a WUR mode defined in an IEEE802.11ba standard;
perform second communication with the other communication apparatus by connecting to the other communication apparatus and by using a radio frame compliant with an IEEE802.11 standard series, wherein the radio frame is a frame different from the WUR frame;
perform a mode control for controlling whether to start the WUR mode to cause the communication apparatus to shift to a power saving state for the second communication or to end the WUR mode to cause the communication apparatus to shift to a communicable state for the second communication;
obtain, from a signal received from the other communication apparatus through the first communication, a value indicating a signal intensity or a signal quality of the signal; and
set, after the WUR mode is started in the mode control and based on both (1) an amount of a change in the obtained value between a first value obtained immediately before the WUR mode is ended and a second value obtained immediately after the WUR mode is started and (2) a first transmission rate that is a transmission rate in the second communication immediately before the WUR mode is started, a second transmission rate in the second communication,
wherein in a case in which the first transmission rate is a maximum transmission rate that can be used by the communication apparatus and the obtained value is not less than a predetermined level, the first transmission rate is set as the second transmission rate.

2. The communication apparatus according to claim 1, wherein the computer-readable instructions further cause, when executed by the one or more processors, the communication apparatus to:
determine, in one of a case in which the first transmission rate is not the maximum transmission rate and a case in which the value is less than the predetermined value, whether an amount of a change in the obtained value is not less than a predetermined amount, and
wherein in a case in which the amount of the change is not less than the predetermined amount, the first transmission rate is changed and the changed first transmission rate is set as the second transmission rate.

3. The communication apparatus according to claim 2, wherein the computer-readable instructions further cause, when executed by the one or more processors, the communication apparatus to determine whether the change is due to an increase in the value or a decrease in the value, and
in a case in which the amount of the change is not less than the predetermined value and the change is due to the increase in the value, a transmission rate obtained by increasing the first transmission rate in correspondence with the amount of the change is set as the second transmission rate.

4. The communication apparatus according to claim 2, wherein in a case in which the amount of the change is not less than the predetermined value and the change is due to a decrease in the value, a transmission rate obtained by decreasing the first transmission rate in correspondence with the amount of the change is set as the second transmission rate.

5. The communication apparatus according to claim 3, wherein an amount to be increased in correspondence with the amount of the change is smaller than an amount to be decreased in correspondence with the amount of the change.

6. The communication apparatus according to claim 3, wherein an amount corresponding to the amount of the change changes step by step with respect to the amount of the change.

7. The communication apparatus according to claim 1, wherein in a case in which a frequency band used in the first communication differs from a frequency band used in the second communication, the first transmission rate is set as the second transmission rate.

8. The communication apparatus according to claim 2, wherein the first transmission rate is changed to the second transmission rate by changing one of a modulation type and a coding rate used by the communication apparatus, the number of frames to be aggregated in frame aggregation, and the number of antennas.

9. The communication apparatus according to claim 1, wherein the signal is a WUR beacon.

10. A method of controlling a communication apparatus that performs first communication with another communication apparatus by using a Wake Up Radio (WUR) frame corresponding to a WUR mode defined in an IEEE802.11ba standard and performs second communication with the other communication apparatus by connecting to the other communication apparatus and by using a radio frame compliant with an IEEE802.11 standard series, wherein the radio frame is a frame different from the WUR frame, the method comprising:

performing a mode control for controlling whether to start the WUR mode to cause the communication apparatus to shift to a power saving state for the second communication or to end the WUR mode to cause the communication apparatus to shift to a communicable state for the second communication;

obtaining, from a signal received from the other communication apparatus through the first communication, a value indicating a signal intensity or a signal quality of the signal; and     setting, after the WUR mode is started in the mode control and based on both (1) an amount of a change in the obtained value between a first value obtained immediately before the WUR mode is ended and a second value obtained immediately after the WUR mode is started and (2) a first transmission rate that is a transmission rate in the second communication immediately before the WUR mode is started, a second transmission rate in the second communication,     wherein in a case in which the first transmission rate is a maximum transmission rate that can be used by the communication apparatus and the obtained value is not less than a predetermined level, the first transmission rate is set as the second transmission rate.

11. A non-transitory computer-readable storage medium storing a computer program for causing a computer to execute a method of controlling a communication apparatus that performs first communication with another communication apparatus by using a Wake Up Radio (WUR) frame corresponding to a WUR mode defined in an IEEE802.11ba standard and performs second communication with the other communication apparatus by connecting to the other communication apparatus and by using a radio frame compliant with an IEEE802.11 standard series, wherein the radio frame is a frame different from the WUR frame, the method comprising:

performing a mode control for controlling whether to start the WUR mode to cause the communication apparatus to shift to a power saving state for the second communication or to end the WUR mode to cause the communication apparatus to shift to a communicable state for the second communication;

obtaining, from a signal received from the other communication apparatus through the first communication, a value indicating a signal intensity or a signal quality of the signal; and     setting, after the WUR mode is started in the mode control and based on both (1) an amount of a change in the obtained value between a first value obtained immediately before the WUR mode is ended and a second value obtained immediately after the WUR mode is started and (2) a first transmission rate that is a transmission rate in the second communication immediately before the WUR mode is started, a second transmission rate in the second communication,     wherein in a case in which the first transmission rate is a maximum transmission rate that can be used by the communication apparatus and the obtained value is not less than a predetermined level, the first transmission rate is set as the second transmission rate.

\* \* \* \* \*